Sept. 20, 1966 B. P. HOOTEN, JR., ET AL 3,274,496

ON-OFF SWITCHING ARRANGEMENT FOR TRANSISTOR RADIOS

Filed April 17, 1963

INVENTORS
BASIL P. HOOTEN
RAIVO VEST
BY
Killman, Smith & Lamb
ATTORNEYS 3,274,496
Patented Sept. 20, 1966

3,274,496
ON-OFF SWITCHING ARRANGEMENT FOR TRANSISTOR RADIOS

Basil P. Hooten, Jr., and Raivo Vest, Baltimore, Md., assignors to The Bendix Corporation, Baltimore, Md., a corporation of Delaware Filed Apr. 17, 1963, Ser. No. 273,749
5 Claims. (Cl. 325—492)

This invention relates to switching arrangements and more particularly to an "on-off" switching arrangement having special utility for transistor radio receivers.

Because of the substantial power dissipation which has been inherent in vacuum tube receivers, the practice has become established to turn such receivers on and off by means of a fairly large and heavy switch. Some economies in size and weight of switches have been effected, but there seems to be a necessity for a switch having some rather significant contact clearances and capable of providing a positive disconnection from the power source. With the advent of transistor powered radios whose current drain is extremely low, the switching devices have been miniaturized somewhat, but the same positive switching action has been retained. For portable radios powered by very small batteries, this action is essential to preserve the batteries. For automobile receivers, however, it has been found that the current drain is so minute in comparison with the capacity of the battery that the positive "on-off" action of typical switching means is not necessary. Further, there are disadvantages of this kind of switching action. The quick and positive movement from the "on" position to the "off" position and vice versa typically involves some sort of over-center spring mechanism carrying a movable contact. This mechanism, when embodied in a structure produced at minimum cost has been found to be a source of maintenance expense. Also, the switch structure usually is embodied in a housing of approximately the same size and shape as the volume control and mounted on the same operating shaft. This means that the combination "on-off" switch and volume control is one of the largest components in the receiver, and adds to the requirement for depth in the chassis, often the dimension which it is most desired to minimize. A third factor is that the positive "on-off" switching action usually results in unpleasant "pops" in the speaker.

An inherent characteristic of a transistor radio is that its current drain varies in some proportion to the audio power delivered. Thus a transistor radio installed in an automobile would draw minimum current if the volume control were turned to its minimum volume position. It actually would be quite feasible to eliminate an "on-off" switch entirely and leave a transistor operated automobile radio connected to the battery at all times. We have found, however, that by means of a slight modification to the standard volume control potentiometer, it can be made to provide the "on-off" function and at the same time reduce the current dissipation substantially below that which would normally occur if the volume were simply turned to its minimum volume position. It is an object of the present invention, therefore, to provide a switching system for transistor radios and particularly for vehicular transistor radios, in which the "on-off" switch function can be accomplished without the need for a component separate from the volume control which adds to the depth of the volume control-switch combination.

It is another object of the present invention to provide an "off-on" switching arrangement for transistor receivers at lower cost than has been the case with typical prior art receivers.

It is another object of the present invention to provide an "on-off" switching arrangement for transistor operated receivers wherein the maintenance problems inherent in the typical positively acting over-center spring mechanism are eliminated.

It is a further object of the present invention to provide a switching arrangement for transistor receivers in which annoying speaker "pops" may be easily eliminated.

It is a further object of the present invention to provide an "on-off" switching arrangement for transistor receivers in which the usual separate "on-off" switching structure is eliminated, but in which current drain is substantially lower than would normally result from leaving the receiver connected to the power supply while in its minimum volume position.

Other objects and advantages will become apparent from the following specification with the accompanying drawings in which.

Figure 1:
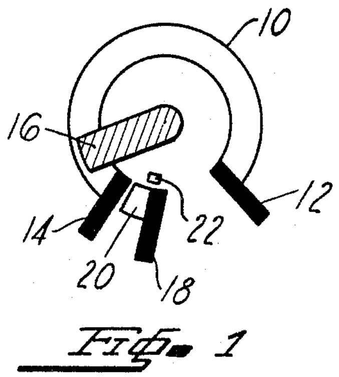
FIG. 1 is a plan view of a volume control modified as required to provide the desired "on-off" action.

Referring now to FIG. 1 which shows a plan view of our special modified volume control potentiometer, an arcuate resistance element is shown at numeral 10 having terminals 12 and 14 at each end thereof. A wiper 16 is rotatable along the surface of resistance element 10, between contacts 12 and 14 to select the desired resistance. Adjacent the terminal 14, which will be assumed to be at the minimum volume end of the potentiometer, is a separate contact 18 which is insulated from the arcuate resistance element 10 and which may include its own short segment of series resistance 20. A detent 22 provides a means for holding wiper 16 against contact 18 and also provides "feel" for the "off" position.

Figure 2:
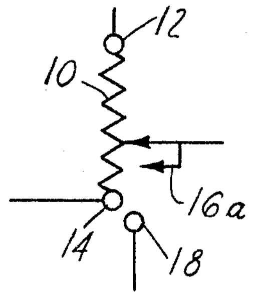
FIG. 2 is a symbol showing the volume control of FIG. 1 as it would appear in a schematic drawing.

FIG. 2 shows the symbol which applicants have adopted to show the use of this special potentiometer in a schematic drawing. Similar numerals have been applied to this schematic presentation and it will be observed that this structure appears as a conventional potentiometer with the addition of a stationary contact 18 separated from the resistance element 10 and a showing of a separate movable contact 16*a* attached to wiper 16 for cooperation with stationary contact 18. Movement of the wiper 16 to its lowest position, as shown on the drawing, will connect terminals 18 and 14 together. While the structure shown in FIG. 1 is typical, it is obvious that a number of modifications would accomplish the same electrical result as that portrayed schematically in FIG. 2. Obviously, it would not be essential for contact 18 to be directly co-planar with resistance element 10. A separate contact on wiper arm 16 could operate to close the circuit between terminals 14 and 18 even though terminal 18 were above or below the plane of resistance element 10. The use of stop or detent 22 which has been shown adjacent the stationary contact 18 is optional depending upon the mechanical performance desired. This stop provides the functions of imparting some "feel" to the switch, so that the operator will know that the wiper 16 is against the stationary contact 18, and also can provide a mechanical holding force assuring that wiper 16 will remain in contact with terminal 18, despite vibration or other small forces tending to produce physical displacement of wiper 16.

Figure 3:
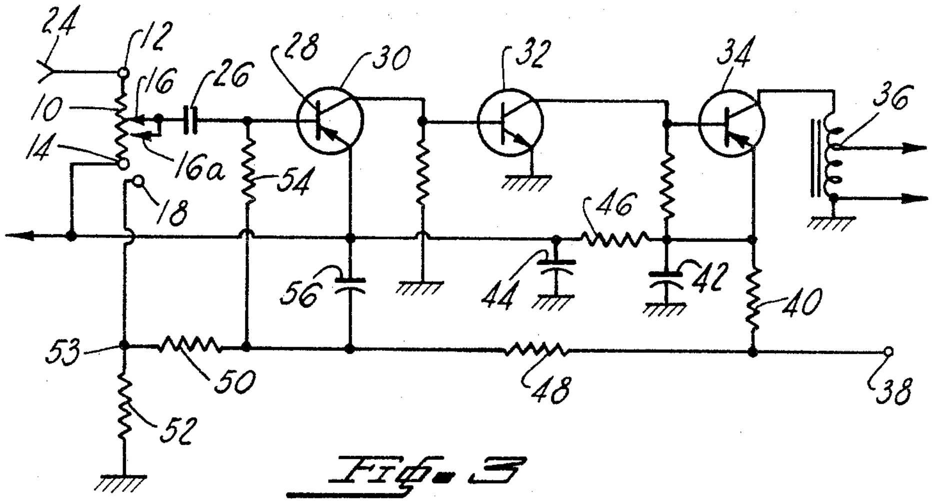
FIG. 3 is a schematic drawing of the audio amplifier and power supply portions of a typical automobile receiver and showing our "on-off" switching arrangement in connection therewith.

FIG. 3 shows a schematic diagram of an audio amplifier section of a typical vehicular radio receiver. The detected signal from the R.F. and I.F. sections of the radio is supplied to a terminal 24 connected to contact 12 on one end of a potentiometer resistance element 10. The wiper 16 of the potentiometer is connected through a coupling capacitor 26 to the base 28 of the first audio amplifier transistor 30. The amplified output from the collector of transistor 30 is directly coupled to the base of transistor 32, where it is further amplified and again directly coupled to the base of the output transistor 34. Connected across the output of transistor 34 is a load inductor 36 which may be tapped as desired to provide the proper impedance for a speaker (not shown). The raw direct current power for the receiver is supplied from the source, which may be an automobile battery, to a terminal 38. Connected to terminal 38 is a resistor 40, which may be a positive temperature coefficient, self-heating type, whose purpose is to stabilize the power supply for the various transistor stages in the receiver. Connected to resistor 40 is a filter circuit consisting of capacitors 42 and 44 and a resistor 46 which cooperate to remove substantially all of the alternating current ripple from the voltage supplied to the emitters of the several transistors ahead of the output transistor 34. It will be particularly noticed that this filtered D.C. voltage is supplied directly to the emitter of transistor 30 and to the terminal 14 on one end of the potentiometer resistance element 10. This voltage will, of course, be at a somewhat lower value than the raw power supply voltage appearing at terminal 38. Also connected to terminal 38 is a voltage divider system including series connected resistors 48, 50 and 52. The terminal 18 is connected to the junction 53 between resistors 50 and 52. A resistor 54 of comparatively small value is connected between the base of transistor 30 and the junction between resistors 48 and 50 and also connected to this junction is a capacitor 56, having its opposite end connected to the emitter of transistor 30.

With the slider 16 in the position shown, the radio receiver is operating normally and a substantially signal will be supplied from the output transistor 34 to the speaker. Typically, there will be approximately 0.3 volt forward bias on the base 28 to keep this and succeeding stages turned on. If this bias is reduced to 0.1 volt or less, the transistor 30 will be biased to cut-off, no collector current will flow and succeeding stages will also be turned off. Inasmuch as the voltage drop across resistor 54 is very low, it may be assumed that the voltage level at the junction between resistors 48 and 50 is essentially the same as that on the base 28 of transistor 30. The values chosen for resistors 50 and 52 will typically be such that resistor 52 will have at least three or four times the resistance of resistor 50. Thus the voltage at junction 53 is somewhat below that measured on the opposite side of resistor 50, but not substantially lower. When the slider 16 is moved downwardly until the auxiliary pointer 16*a* contacts 18, the filtered direct current power supplied to the emitter of transistor 30 is also directly connected to junction 53. This voltage being significantly higher than that which normally appears at this junction, the voltage on the opposite side of resistor 50 and, consequently, that appearing at the base 28 of transistor 30 is also raised to a value approximately the same as or above that on the emitter of this transistor. This effectively biases this transistor to cut-off or beyond and shuts off the entire audio amplifier. Since the current drawn by the radio frequency, converter and intermediate frequency stages is only a few milliamperes (typically, less than 5 milliamperes) and this is negligible current drain from an automobile battery, the radio is, for all practical purposes, turned off.

This configuration provides another significant advantage in addition to those of cost savings, reliability, and reduced physical dimensions. This is in providing a very simple and straightforward means for eliminating loud speaker "pops" at the time that the radio is turned either off or on. With the arrangement shown in FIG. 3, the only significant source of stored energy for producing such "pops" in the capacitor 56. Inasmuch as the charge and discharge time constants of capacitor 56 become the only significant factor in these "pops" and resistor 50 is the only resistance effectively in series with the capacitor 56, it will be quite apparent to those skilled in the art that, by proper selection of the value of resistor 50, the sudden transients which cause loud speaker "pops" may be effectively eliminated. The foregoing may be contrasted with the situation in a typical automobile radio receiver where the "on-off" switch may be located in the power line at approximately the position at terminal 38. When the radio is turned on, full line voltage appears across the capacitor 42 and opening of the switch will cause the accumulated charge on this capacitor to be discharged very quickly through the load inductor 36 and the speaker coil.

While only one embodiment has been shown and described herein, modifications may be made to suit the requirements of individual applications without departing from the scope of the present invention.

The invention claimed is:

1. In a transistor powered radio receiver,
a source of direct current power,
an audio amplifier including at least one transistor connected to said source,
and a volume control potentiometer including a resistance element having one end connected to said source and a wiper connected to the input electrode of said transistor:
switch means for turning said receiver on and off including a contact connected in the input circuit of said transistor and so constructed and arranged with respect to said wiper that movement of said wiper to its said one end connects said source to said input circuit such that said transistor is biased to cut-off and said audio amplifier is effectively turned off.

2. In a transistor powered radio receiver,
a source of direct current power,
filtering means connected to said source providing a source of filtered direct current power at a potential somewhat lower than said first source,
amplifying means including at least one transistor having its emitter connected to said source of filtered direct current power and its base connected to said first named source,
and a volume control potentiometer including a resistance element having one end connected to said source of filtered direct current power and a wiper connected in the circuit of said base:
switch means for turning said receiver on and off including a contact connected in the circuit of said base and so constructed and arranged with respect to said wiper that movement of said wiper to its said one end connects said source of filtered direct current power to the circuit of said base such that said transistor is biased to cut-off and said amplifying means is effectively turned off.

3. In a transistor powered radio receiver including a source of direct current power, an audio amplifier connected to said source including at least one transistor having a base electrode and a volume control potentiometer connected to said base electrode for varying the magnitude of the audio signal supplied thereto, said potentiometer including a resistance element and a wiper adapted to be manually positioned along said resistance element:
switch means for turning said receiver on and off including a contact forming part of the structure of said potentiometer and located adjacent the minimum volume end of said resistance element and insulated therefrom, said contact being connected in the base circuit of said transistor such that rotation of the wiper of said transistor to its minimum volume position causes said contact to connect said source to said base circuit such that said transistor is biased to cut-off and said audio amplifier is effectively turned off.

4. In a transistor powered vehicular radio receiver including a source of direct current power, filtering means for said power supply, an audio amplifier connected to said source including at least one transistor having a control electrode and an output electrode, and a volume control potentiometer connected to said control electrode for varying the magnitude of the audio signal supplied thereto, said potentiometer including a resistance element having one end connected to the filtered power supply voltage for said transistor and its opposite end connected to receive an audio frequency signal and a wiper adapted to be selectively positioned along said resistance element:

switch means for turning said radio on and off including a contact forming part of the structure of said potentiometer located just beyond the minimum volume end of said resistance element and insulated therefrom, said contact being connected in the input circuit of said transistor such that rotation of the wiper of said resistance element to the minimum volume position causes said contact to be connected to said filtered supply voltage, thereby biasing said transistor such that no output is produced and causing said audio amplifier to be effectively turned off.

5. In a transistor powered radio receiver including a source of direct current power, filtering means connected to said source producing filtered direct current power at a voltage slightly below that of said source, an audio amplifier connected to said source including at least one transistor having an emitter electrode connected to said filtering means and a base electrode, and a volume control potentiometer including a resistance element having its minimum volume end connected to said filtering means and a wiper adapted to be manually positioned along said resistance element and connected to said base electrode:

switch means for turning said receiver on and off including a contact forming part of the structure of said potentiometer and located adjacent the minimum volume end of said resistance element and insulated therefrom, said contact being connected in the base circuit of said transistor such that rotation of the wiper of said resistance element to its minimum volume position causes said contact to connect the output of said filtering means to said base circuit such that said transistor is biased to cut-off and said audio amplifier is effectively turned off.

No references cited.

KATHLEEN H. CLAFFY, *Primary Examiner.*

R. LINN, *Assistant Examiner.*